United States Patent
Son et al.

(10) Patent No.: US 9,870,042 B2
(45) Date of Patent: Jan. 16, 2018

(54) APPARATUS AND METHOD MANAGING POWER BASED ON DATA

(71) Applicant: SAMSUNG ELECTRONICS CO., LTD., Suwon-si, Gyeonggi-do (KR)

(72) Inventors: Min Young Son, Hwaseong-si (KR); Seung Won Lee, Hwaseong-si (KR); Shi Hwa Lee, Seoul (KR); Jae Don Lee, Yongin-si (KR); Chae Seok Im, Yongin-si (KR); Min Kyu Jeong, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 387 days.

(21) Appl. No.: 14/275,311

(22) Filed: May 12, 2014

(65) Prior Publication Data

US 2014/0344602 A1 Nov. 20, 2014

(30) Foreign Application Priority Data

May 14, 2013 (KR) .................. 10-2013-0054522

(51) Int. Cl.
*G06F 1/32* (2006.01)
*G06F 9/45* (2006.01)

(52) U.S. Cl.
CPC ............ *G06F 1/3234* (2013.01); *G06F 1/329* (2013.01); *G06F 1/3243* (2013.01); *G06F 8/4432* (2013.01); *Y02B 60/181* (2013.01)

(58) Field of Classification Search
CPC .... G06F 1/3203; G06F 1/3234; G06F 1/3246; G06F 1/329; G06G 8/4432; Y02B 60/181
See application file for complete search history.

(56) References Cited

U.S. PATENT DOCUMENTS

| | | | | |
|---|---|---|---|---|
| 5,557,557 A | * | 9/1996 | Frantz | G01R 22/00 702/60 |
| 5,790,877 A | * | 8/1998 | Nishiyama | G06F 1/08 712/E9.032 |
| 6,307,281 B1 | | 10/2001 | Houston | |
| 6,625,740 B1 | * | 9/2003 | Datar | G06F 9/30181 713/300 |
| 6,775,787 B2 | * | 8/2004 | Greene | G06F 1/3203 712/E9.049 |
| 2003/0182589 A1 | | 9/2003 | Tani | |
| 2004/0260959 A1 | | 12/2004 | Tani | |

(Continued)

FOREIGN PATENT DOCUMENTS

EP 2687944 A2 1/2014
JP 11-316690 11/1999

(Continued)

OTHER PUBLICATIONS

Extended European Search Report dated Oct. 10, 2014 in related European Application No. 14168289.8.

*Primary Examiner* — Thuan Du
(74) *Attorney, Agent, or Firm* — Sughrue Mion, PLLC

(57) ABSTRACT

A processing apparatus for managing power based on data is provided. The processing apparatus may obtain, in response to an access request from a processor for particular data stored in a memory, existing power information having a predefined correspondence to the particular data, and control a power mode of the processor based on the existing power information.

43 Claims, 9 Drawing Sheets

(56) References Cited

U.S. PATENT DOCUMENTS

2006/0179329 A1    8/2006  Terechko et al.
2012/0284475 A1   11/2012  Zaarur

FOREIGN PATENT DOCUMENTS

| JP | 2001-184208 | 7/2001 |
| JP | 2003-296123 | 10/2003 |
| JP | 2004-318502 | 11/2004 |
| JP | 2006-509291 | 3/2006 |

* cited by examiner

310 — (lp) int a;                                     // variable
320 — (mp) char b[10];                                // array
330 — (hp) void ISR0 (unsigned int uiISRNum){ ··· }   // function
       void decode( (gp) inputData, }·                // argument
       _lp_ {···}                                     // region
            340

| Address | Length | Power info. | Weight |
|---|---|---|---|
| 0x03128095 | 0x1000 | Low power | 0.5 |
| 0x04008400 | 0x2000 | High power | 0.8 |
| .... | .... | .... | .... |

600

APPARATUS AND METHOD MANAGING POWER BASED ON DATA

CROSS-REFERENCE TO RELATED APPLICATIONS

This application claims the priority benefit of Korean Patent Application No. 10-2013-0054522, filed on May 14, 2013, in the Korean Intellectual Property Office, the disclosure of which is incorporated herein by reference.

BACKGROUND

1. Field

One or more embodiments relate to a processing apparatus and processing method applicable to one or more elements requiring power management in a mobile device, a multimedia device, an embedded system, and the like.

2. Description of the Related Art

In lieu of a single processor with excellent performance, a multi-core system using multiple processors with relatively low performance is currently being widely used in mobile devices and various embedded systems. For example, a multi-core system may be used because the process by which an excellent performing processor is manufactured may be more difficult than the process by which multiple lesser performing processors are manufactured, and because the resultant power consumption of such an excellent performing processor may be relatively high compared to the power consumption of such lesser performing processors.

A number of identical processors may be used in the multi-core system, or the multi-core system may be configured to be a heterogeneous multi-core system using a number of different types of processors. By using multiple different processors unnecessary wasting of resources and power consumption may be reduced.

However, although the multi-core system may use a relatively lower amount of power, compared to a single processor with identical performance, the issue of power consumption may still need to be overcome in mobile devices and high-performance supercomputing.

SUMMARY

One or more embodiments provide a processing apparatus including a processor, a power information manager to determine, in response to an access request requesting provision of a particular data to the processor, whether there exists predefined power information corresponding to the particular data indicating a suggested power mode for the processor when the processor is processing the particular data, and a power controller to selectively control a current power mode of the processor when the processor is processing the particular data based on the predefined power information, when the determination indicates that the predefined power information exists.

The predefined power information may indicate one of plural suggested power modes for the processor when the processor is processing data, the plural suggested power modes including at least a lower power mode, a higher power mode, and a power mode between the lower power mode and the higher power mode.

The power information manager may determine whether the predefined power information exists in a generated power information table, the generated power information table respectively including address information and corresponding predefined power information for different particular data.

The power information manager may generate the power information table by analyzing a power information code associated with an execution code providing execution instructions to the processor regarding processing the particular data.

The power information code may be linked by a linker of a compiling system with the execution code to generate a binary file, with a compiler of the compiling system extracting power information, respectively identified in the source code with respect to data from a source code, that is included in the power information code, distinguished from a generating of the execution code from a compiling of the source code.

The power information code may include, for each compiler identified data for which power information exists, address information of each compiler identified data and power mode information for each compiler identified data, and the generated power information table may include extracted address information for each compiler identified data and extracted power mode information for each compiler identified data.

The information manager may determine whether the predefined power information exists in the generated power information table by comparing a data address included in the access request with a plurality of different determined ranges of addresses represented in the generated power information table to determine whether the data address included in the access request falls within any of the different determined ranges of addresses, and if yes, locate a corresponding power information identified in the generated power information table for a found determined range of addresses that the data address included in the access request falls within, wherein each of the different determined ranges of addresses represent different data stored in a memory that the processor is set to process when executing the execution code.

The power information manager may determine whether the predefined power information exists in a generated power information table, the generated power information table including at least address information of select data, of plural data stored in a memory, for which power information exists, wherein the plural data stored in the memory are data set for processing by the processor when executing an execution code.

The power information manager may determine whether the predefined power information exists by comparing a data address included in the access request with a plurality of different determined ranges of addresses represented in the generated power information table to determine whether the data address included in the access request falls within any of the different determined ranges of addresses, and if yes, locate a corresponding power information for a found determined range of addresses that the data address included in the access request falls within, wherein each of the different determined ranges of addresses represent different data stored in the memory that the processor is set to process when executing an execution code.

The apparatus may further include a memory manager to perform a reading operation to read the particular data from the memory based on a data address included in the access request, wherein the power information manager may generate or add to the power information table when power information corresponding to the particular data is read in the reading operation, to include address information of the particular data in the power information table.

In the generating of or adding to the power information table, the power information manager may include the read power information corresponding to the particular data in the power information able.

The apparatus may further include a memory to store differing data, including the particular data, that the processor is set to process when executing an execution code.

The power information manager may include an address obtainer to obtain a memory address included in the access request for the particular data in the memory, a power information verifier to determine whether the predefined power information exists based on a comparison of the obtained memory address and plural address information in a power information table, each of the plural address information in the power information table representing address information for a data, of the differing data stored in the memory, for which corresponding predefined power information exists, and a power information provider to provide, when the power information verifier determines that the predefined power information exits, the predefined power information to the power controller.

The power information table may include a plurality of power information tuples, and wherein each of the plurality of power information tuples may include at least one of an initial address of a respective stored data, in the memory, for which power information exists, a length of the respective stored data, and an indication of a suggested power mode, corresponding to the respective stored data, for the processor when the processor is processing the respective stored data.

Each of the plurality of power information tuples may further include a respective weight for the suggested power mode, corresponding the respective stored data, and the power controller may use the respective weight to control the processor to operate according to a determined appropriate power mode when the processor is processing the respective stored data.

The power controller may store, separate from the power information table, power information of an immediately previous power mode of the processor and/or an immediately previous determined appropriate power mode for the processor, and determines a current appropriate power mode for the processor, to be implemented when the processor is processing a current respective stored data, based on at least two of the stored power information of the immediately previous power mode, the immediately previous determined appropriate power mode, and a current respective weight corresponding to the current respective stored data.

The power controller may include a power mode determiner to determine an appropriate power mode for the processor, to implement when the processor is processing the particular data, based on the predefined power information, and a power mode controller to control the current power mode of the processor to be the appropriate power mode.

The apparatus may further include an binary file processor to obtain a binary file, and to extract an execution code and a power information code from the binary file, and a memory loader to load the execution code to the memory, wherein the power information manager may generate or updates a power information table based on the power information code, and wherein the power information code may be configured to include, for each of select data of the differing data stored in the memory, information to identify the select data, from the differing data, and a corresponding suggested power mode for the processor to implement when the processor is processing the select data.

The power information manager may generate or update the power information table based on the power information code and a result of the loading of the execution code to the memory.

The power information table may be generated or updated based on the information to identify the select data, in the power information code, being a virtual address of the select data and the power information table including corresponding information to identify the select data, from the differing data stored in the memory, as a physical address of the memory.

The binary file may be generated by a compiler and a linker of a compiling system, with the linker having linked the execution code and the power information code to generate the binary file, such that the power information code is based on power information extracted from a source code by the compiler using power mode indicators included in the source code identifying particular respective data in the source code, distinguished from a generation of the execution code by a compiling of the source code by the compiler.

One or more embodiments provide a processing apparatus including a plurality of processors, a power information manager to determine, in response to an access request requesting provision of a particular data to a select processor of the plurality of processors, whether there exists predefined power information corresponding to the particular data indicating a suggested power mode for any of the plurality of processors when the select processor is processing the particular data, and a power controller to selectively control a current power mode of the select processor when the select processor is processing the particular data based on the predefined power information, when the determination indicates that the predefined power information exists.

The apparatus may further include a memory to store differing data, including the particular data, that the plurality of processors are set to process when executing an execution code.

The power information manager may provide, to the power controller, the predefined power information to control the current power mode of the select processor when the select processor is processing the particular data, and provide the predefined power information to the power controller to control a power mode of at least another processor, of the plurality of processors, in response to an access request requesting provision of the particular data to the other processor, so that the predefined power information is provided to the power controller for the particular data irrespective of which of the plurality of processors requests the particular data.

When a first processor and a second processor, of the plurality of processors, request respective data for which there respectively exists corresponding identical power information, the power controller may control a power mode of the first processor and a power mode of the second processor differently, based on the identical power information.

One or more embodiment include an apparatus for managing power based on data, the apparatus including a processor, a memory controller to read select data, including a particular data and from differing data set for selective processing by the processor during an execution process, from a memory including the differing data in response to an access request requesting provision of the particular data to the processor, and to provide the read particular data to the processor, and a power controller to control a current power mode of the processor based on power information included in the read select data, according to a determination that the power information is included in the read select data, where the power information includes a suggested power mode for the processor when the processor is processing the particular data.

The apparatus may include the memory to store the differing data, the differing data including data for which respective power information for controlling respective power modes of the processor exists and data for which respective power information for controlling respective power modes of the processor do not exist.

The power information included with the particular data in the read select data may be distinct from another power information included in another read select data, including another particular data, such that the other power information includes a different suggested power mode for the processor when the processor is processing the other particular data.

The memory controller may provide, when the determination indicates that power information is included in the read select data, the power information to the power controller for the control of the current power mode for the processor when the processor is processing the particular data.

One or more embodiments include a processing method including determining, in response to an access request requesting provision of a particular data to a processor, whether there exists predefined power information corresponding to the particular data indicating a suggested power mode for the processor when the processor is processing the particular data, and controlling the processor to selectively operate using a plurality of power modes, including controlling a current power mode of the processor based on the predefined power information, when the determination indicates that the predefined power information exists.

The method may further include detecting for the access request for the particular data.

The access request may be requesting provision of the particular data from a memory, from differing data set for selective processing by the processor during an execution process.

The detecting for the access request may include obtaining a memory address included in the detected access request and the determining of whether the predefined power information corresponding to the particular data exists may be based on a comparison of the obtained memory address and a power information table, wherein the obtained memory address corresponds to an address in the memory for the particular data.

When the determining of whether the predefined power information corresponding to the particular data exists based on the comparison, the predefined power information corresponding to the particular data may be obtained from the power information table.

The power information table may include a plurality of power information tuples, wherein each of the plurality of power information tuples may include at least one of an initial address of a respective stored data, in the memory, for which power information exists, a length of the respective stored data, and an indication of a suggested power mode, corresponding to the respective stored data, for the processor when the processor is processing the respective stored data.

Each of the plurality of power information tuples may further include a respective weight of the suggested power mode, corresponding to the respective stored data, and the controlling of the current power mode of the processor may include controlling the processor to operate according to a determined appropriate power mode based on the respective weight when the processor is processing the respective stored data.

The method may further include storing power information of an immediately previous power mode of the processor and/or an immediately previous determined appropriate power mode for the processor separate from the power information table, and determining a current appropriate power mode for the processor, to be implemented when the processor is processing a current respective stored data, based on at least two of the stored power information of the immediately previous power mode, the immediately previous determined appropriate power mode, and a current respective weight corresponding to the current respective stored data.

The controlling of the current power mode of the processor may include determining whether a power mode of the processor is to be changed, for implementation when the processor is processing the particular data, based on the predefined power information, and causing the power mode of the processor to change, based on a result of the determining, of whether the power mode of the processor is to be changed, indicating that the power mode of the processor is to be changed.

The method may further include obtaining a binary file, and extracting an execution code and a power information code from the binary file, loading the execution code to the memory, and generating or updating a power information table based on the power information code, wherein the power information code may be configured to include, for each of select data of the differing data stored in the memory, information to identify the select data, from the differing data, and a corresponding suggested power mode for the processor to implement when the processor is processing the select data.

The generating or updating of the power information table may be based on the power information code and a result of the loading of the execution code to the memory.

The power information table may be generated or updated based on the information to identify the select data, in the power information code, being a virtual address of the select data and the power information table including corresponding information to identify the select data, from the differing data stored in the memory, as a physical address of the memory.

The binary file may be generated by a compiler and a linker of a compiling system, with the linker having linked the execution code and the power information code to generate the binary file, such that the power information code is based on power information extracted from a source code by the compiler using power mode indicators included in the source code identifying particular respective data in the source code, distinguished from a generation of the execution code by a compiling of the source code by the compiler.

Additional aspects and/or advantages will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 3 illustrates a method of specifying data-based power information, according to one or more embodiments;

FIG. 5 illustrates a power information set, according to one or more embodiments;

DETAILED DESCRIPTION

Figure 1:
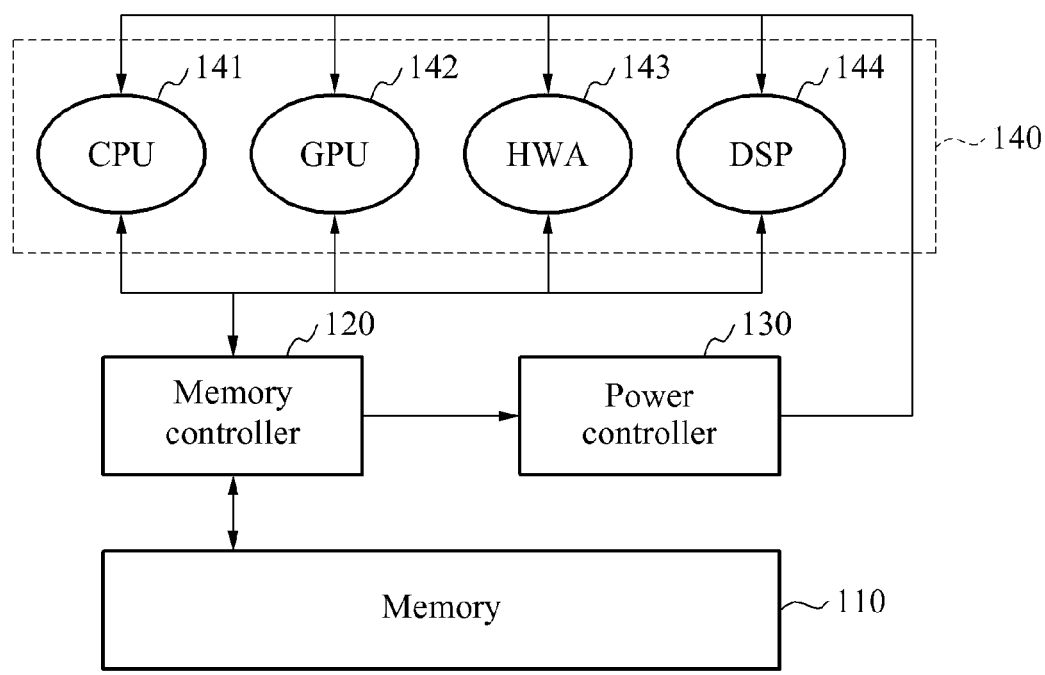
FIG. 1 illustrates a processing apparatus including a plurality of processors, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention. Also, terminologies used herein are defined to appropriately describe the exemplary embodiments and thus may be changed depending on a user, the intent of an operator, or a custom. Regardless, the terminologies should be defined based on the overall disclosure in the present application FIG. 1 illustrates a processing apparatus 100 including a plurality of processors, according to one or more embodiments.

Referring to FIG. 1, the processing apparatus 100 may perform data-centric power management. In a case in which respective power information corresponding to data for the processing apparatus 100 is available, a processor may manage power based on the corresponding power information when the data is processed. As only an example, in one or more embodiments, when power information for a particular data has been previously specified, e.g., by a user, all processors may manage power automatically based upon which particular data the respective processor(s) are requesting to access.

Thus, when the processing apparatus 100 is used, convenience of users may be improved. In addition, fine-grained power management may be possible.

When compared to a single core system, in a multi-core system, a memory size or an access speed may play a decisive role in system performance, indicating that performance of the multi-core system may be determined based on the data being processed, other than just the computation of that data. When the processing apparatus 100 is used, power management technology suitable for the multi-core system may thus be provided.

The processing apparatus 100 may be suitable for multimedia applications. For example, in one or more embodiments where the data is multimedia data, the data may be processed in a manner similar to a flowing stream, for example, a pipeline computing. When computing is performed based on data, power management may be changed depending on the particular data used for that performed computing.

Accordingly, the processing apparatus 100, according to the one or more embodiments, may include a memory 110, a memory controller 120, a power controller 130, a processor 140, and a power information manager, for example.

The processor 140 may operate using a plurality of controlled power modes. The memory 110 may store data that may be used during an operation of the processor 140.

The power information manager may verify, in response to an access request signal from the processor 140 to the memory 110, whether there exists power information corresponding to particular data requested to be accessed by the processor 140 according to the access request signal. Depending on embodiment, the power information manager may be included in the memory controller 120 or the power controller 130, as only examples. Alternatively, the power information manager may also be provided separately from the memory controller 120 and the power controller 130.

Hereinafter, for only ease of description, the power information manager may be referred to as being included in the memory controller 120. However, as described above, the implementation of the power information manager is not limited to a case in which the power information manager is included in the memory controller 120.

Thus, when power information corresponding to particular data, requested to be accessed, e.g., based on an access request signal of the processor 140, is determined to exist, the power controller 130 may control a power mode of the processor 140 based on the power information determined to exist for that particular data.

The processor 140 may perform processing, for example, performing computations using data stored in the memory 110. The processor 140 may be a multi-core system including a plurality of heterogeneous sub-processors, for example, one or more central processing units (CPUs) 141, one or more graphics processing units (GPUs) 142, one or more hardware accelerators (HWAs) 143, along with one or more digital signal processor (DSPs) 144, and the like. Depending on embodiment, alternatively, the processor 140 may include a multi-core system including a plurality of homogeneous sub-processors, e.g., the processor 140 may include only plural CPUs 141, only plural GPUs 142, only plural HWAs 143, or only plural DSPs 144, as only examples.

The processor 140 may access the memory 110 through the memory controller 120. More particularly, sub-processors included in the processor 140 may respectively access the memory 110 through one or more such memory controllers 120.

Here, a connection structure, a number, and/or a configuration of each hardware element described with regard to FIG. 1 may be changed, depending on embodiment.

According to one or more embodiments, the memory controller 120 may provide, to the power controller 130, the same power information that is determined to correspond to the same particular data that is requested to be accessed, irrespective of a type of a sub-processor requesting the access of the particular data.

For example, the CPU 141 and the GPU 142 may request an access to the same particular data stored at a particular address, either at the same time or different times. In this instance, the memory controller 120 may provide the same power information, determined to correspond to that requested particular data, to the power controller 130 for the CPU 141 and the GPU 142 based on the predetermined correspondence of that power information and that particularly requested data.

However, depending on embodiment, the power controller 130 may selectively control a power mode of the CPU 141 and a power mode of the GPU 142 differently, based on the same power information received from the memory controller 120.

In particular, in one or more embodiments, when the same power information is received by the power controller 130, the power controller 130 may still control the power mode of the CPU 141 and the power mode of the GPU 142 differently, based on an internal policy. Thus, as only an example, the ultimate power management of the respective sub-processors of the processor 140, though based on the same power information, may be the same or different depending on respective power management policies for each sub-processor.

According to one or more embodiments, the memory 110 may store and maintain data in which respective types of power management to be respectively used are classified. As only an example, the memory 110 may store a particular data, to be used during processing by the processor 140, along with its corresponding power information. As another example, the memory 110 may store power information code along with the binary file of the underlying application, for example, that is being executed by the processor 140, and the power information manager may generate a power information table that includes respective power information extracted from the power information code.

Thus, based upon a request for the particular data by the processor 140 (or any sub-processor), when the memory controller 120 accesses the memory 110 for the particular data requested by the processor 140, the memory controller 120 may also transmit a signal to the power controller 130 representing the power information corresponding to the requested particular data and the power controller 130 may adjust the power usage of the processor 140 based on that transmitted signal from the memory controller 120. Here, the power information may have been determined by the power information manager before, while, or after the memory controller accesses the memory 110 for the requested particular data for provision to the processor 140.

For example, the memory controller 120 may read data from the memory 110 for a particular data and provide the particular data to the processor 140, as requested. In this example, and according to one or more embodiments, the memory controller 120 may also verify whether an indication of the type of power, or power management mode, to be used for the particular data is also included in the read data. When the type of power to be used for the particular data is verified as being included in the read data, the memory controller 120 may provide that verified type of power to be used, or power management mode, to the power controller 130, e.g., as corresponding power information. The power controller 130 may then selectively control the power of the processor 140 based on the type of power to be used, for the particular data, as transferred from the memory controller 120. Thus, in this example, the power controller 130 may control the power of the processor 140, based on the type of power to be used included in the read data for a particular data requested by the processor 140.

Alternatively, in one or more embodiments, and only as an example, the corresponding power information may exist separate from the data to be processed by the processor 140, for example, in a power information code that is arranged with an execution code, e.g., for a particular application, that controls processing operations of the processor 140. Here, the power information manager, for example, may access the power information code and generate a power information table, as only an example, similar to the illustrated table of FIG. 5. Accordingly, when a particular data is requested by the processor 140, based on instructions from the execution code, there may be a determination as to whether it is found that there exists corresponding power information for that requested particular data in the generated power information table, and if yes, the memory controller 120 may read the requested particular data from the memory 110 and provide that requested particular data to processor 140, while the power information manager provides the found power information to the power controller 130, for ultimate power management of the processor 140 based on the provided power information Here, in either example, if corresponding power information is determined to not exist for the requested particular data, then the memory manager 130 may merely provide the processor 140 the requested particular data and the processor 140 may continue to operate in a same power mode the processor 140 was previously operating in. Though power information may not be determined to exist for the requested particular data, the power controller 130 may still differently control the processor 140 based upon alternative power management schemes currently also being implemented and/or based upon different weightings applied to a previously provided power information, to control the power management mode of at least the processor 140 (or sub-processor) that requested the particular data from memory 110.

Figure 2:
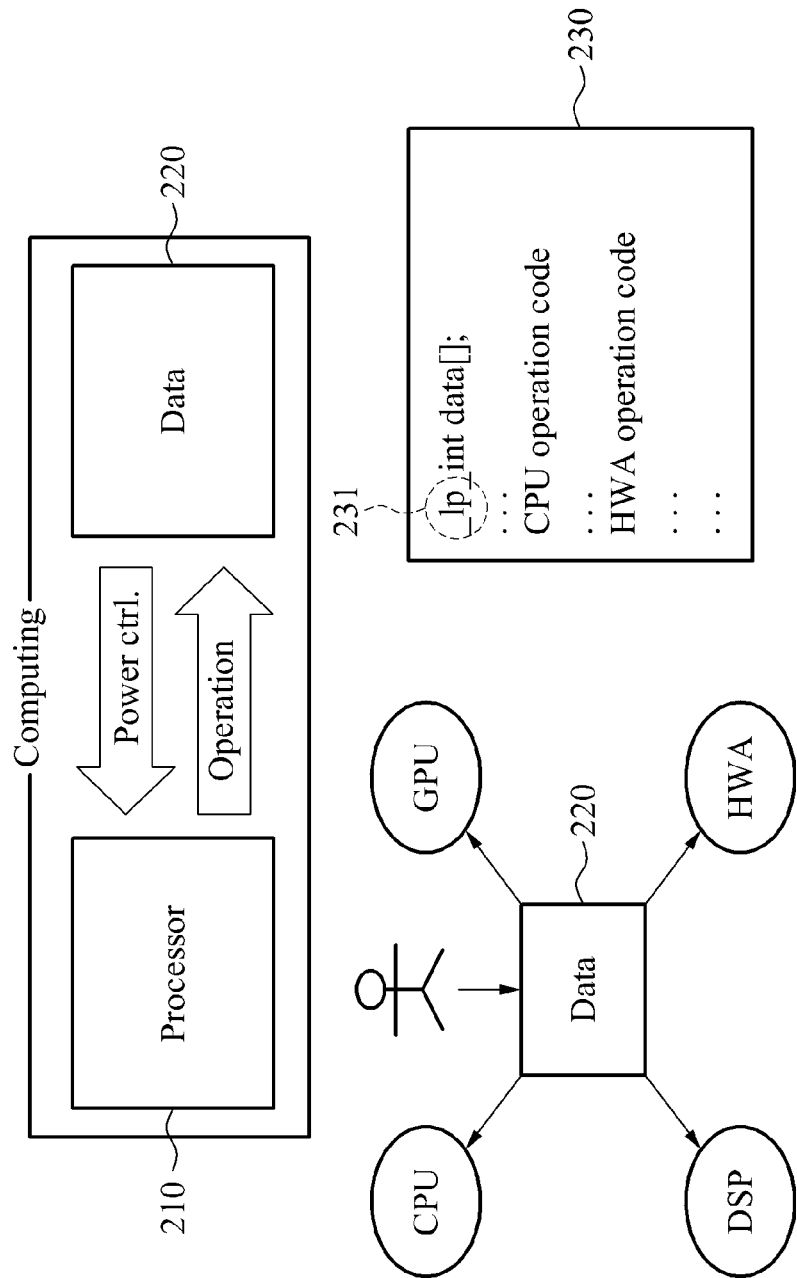
FIG. 2 illustrates a method of managing power based on data, according to one or more embodiments.

FIG. 2 illustrates a method of managing power based on data, according to one or more embodiments.

Referring to FIG. 2, data 220 may include differing data whose access may be requested by a processor 210 and respective power information for one or more of the differing data of data 220.

When the processor 210 performs an operation using a particular data of the differing data of data 220, the processor 210 may also perform that operation based on corresponding power information, for the particular data, included in the data 220. As noted above, there may not exist power information for all data of the differing data, but when power information is determined to exist for a requested particular data included in data 220 then the processor 210 may perform that operation using that requested particular data based on the determined-to-exist power information.

FIG. 2 additionally illustrates how data 220 may be generated to selectively include power information for respective data of the differing data included in the data 220. As only an example, when a user develops a program source code 230, the user may include a power management indicator 231 in the source code along with the reference to a particular data in the source code. The power management indicator 231 may identify the type of power management that may be applied to the processor 210 when the processor 210 is executing the execution code corresponding to the source code and requests that particular data.

Briefly, such an inclusion of different power management indicators 231 in the source code is merely an example embodiment for predefining which power information corresponds to which particular data that may ultimately be accessed by the processor(s) when operating according to the execution code that corresponds to the source code. For example, the power information may be extracted from the source code, e.g., during compiling of the source code, based on the power management indicators 231 included in the source code, and that extracted power information may ultimately be provided to a processing apparatus, such as the processing apparatus 100 of FIG. 1, in a form that is not derived from the corresponding object code, resulting from the compiling of the source code.

FIG. 3 illustrates a method of specifying data-based power information, according to one or more embodiments.

In FIG. 3, as discussed above, different types of power management corresponding to differing data may be specified by a user through programming of a source code 300, for example, and in particular, by including power management indicators 310, 320, 330, and 340 in the source code.

According to the one or more embodiments, example types of power management to be used correspond to power modes, such as a low power (LP) mode, a middle power (MP) mode, a high power (HP) mode, and the like, and these types of power management may be respectively defined in the source code as the example power management indicators.

In addition, as only an example, a power management indicator of a generic template power (GP) mode may be defined to be used as an argument of a function. An argument declared as a power management indictor of the generic template power GP mode may include all data of types of power management to be used corresponding to the power modes, for example, the LP mode, the MP mode, the HP mode, and the like.

The power management indicators may be specified in the source code 300 for a type of data, attributes, and the like, and may be different depending on the programming language.

For example, the power management indicator "_lp_" 310 may be inserted in the source code to specify the type of power management to be used for a particular variable, such as "a" classified as an integer, so that the power mode for that variable "a" may be defined as the LP mode.

The power management indicator "_mp_" 320 may be inserted in the source code to specify the type of power management to be used for a particular array variable, such as "b[10]" classified as a character, so that the power mode for that array variable "b[10]" may be defined as the MP mode.

The power management indicator "_hp_" 330 may be inserted in the source code to specify the type of power management to be used in a definition of a particular function, such as "ISR0", so that the power mode may be defined for the function "ISR0" to be the HP mode.

The power management indicator "_gp_" 340 may be inserted in the source code to specify the type of power management to be used in "inputData" among arguments of a particular function, such as "decode", so that the power mode may be defined for the function "decode" to be the GP mode.

Thus, a method of setting a power mode for particular data, for when differing data is processed by a processing apparatus, may be implemented by introducing power management indicators when composing the source code, introducing a new type of data to an existing source code with a desired power management indicator, or by inserting a power management indicator to existing types of data of the source code for respective desired types of power management to be used for respective existing types of data, as only examples.

As discussed below with regard to FIG. 4, as only an example, the identified power information 450 may be derived or extracted based upon operations by the compiler 420 when analyzing the source file 410. For example, a controller may search the entire source code, e.g., stored in a memory, for one or more of the above noted power management indicators "_lp_", "_mp_", "_hp_", "_gp_", and the like. When at least one such power management indicator is found in the source code, power information for the corresponding data of that found power management indicator may be generated, for example, by either the compiler 420 or such a controller. In an embodiment, the power information 450 of the below discussed FIG. 4 may be power information for a single particular data or respective power information for differing data found by such a controller. In addition, such a controller may search alternative memory sources for information on power information for differing data that is referenced in the source code. For example, such power management indictors may similarly be used in such alternative memory sources to identify the differing data referenced in the source code, for the generation of the example power information 450. Further, alternative mechanisms may be available to generate the example power information 450 beyond such power management indicators that may be used in the source code. Still further, the example power information 450 may ultimately be in a different form from the power information actually provided or made available to the processing apparatus, such as processing apparatus 100 of FIG. 1, and available for generation, alteration, or deletion independent of the binary file that includes the execution code, e.g., by a user controlling the processing apparatus 100 of FIG. 1. Thus, there are multiple potential sources for the power information that may be searched for with regard to a particular data that is requested by a processor or sub-processor in the processing apparatus 100 of FIG. 1, and which may ultimately be used by the processing apparatus 100 to control a power mode of the processor or sub-processor when processing the requested particular data.

Conventionally, power management may be performed based on particular sections, portions, or blocks of the source code eventually being represented in the execution code and which specify exactly how power management is to be performed for a particular processor when that particular section, portion, or block of the source code is executed. A compiler may compile the source code including such particular section, portion, or blocks to an object code, and eventually into an execution code for the underlying program or application, for example. In this conventional example, a portion of the source code may be set to be a Low Power section and power usage of the processor may be managed according to the Low Power mode when processing that Low Power section. Thus, conventional power management is a code-based power management, where power management information is incorporated into the source code, then an object code, and ultimately a corresponding execution code. For example, conventional power management may only be available through a user application program interface (API) for a CPU 141, an API specifically for the GPU 142, and/or an API specifically for the DSP 144. Conventionally, the resultant execution code would include binary execution coding corresponding to these particular power mode defined sections or portions of the originating source code, so that the execution code would control the power management of the processor.

Conversely, a data-based power management apparatus, according to one or more embodiments, may perform power management based on particular data, rather than the directly above noted conventional code-based power management approach. In particular, in a data-based power management apparatus according to one or more embodiments, a power mode may be set for the particular data that may be used in one or more processing operations of a processor, so that a processor may operate in the appropriate power mode when that particular data is potentially eventually processed by the processor. In one or more embodiments, such information of the potentially differing power management implementations for respectively different data may be, or may have been, extracted or found by a compiler, for example, and provided to the ultimate processing apparatus through a different mechanism than the execution code. Similarly, according to one or more embodiments and as only an example, in a processing apparatus implementing a data-based power management, when a processor or sub-processor of the processing apparatus requests a particular data, e.g., based on an execution code being executed by the processor or sub-processor, the processing apparatus may determine whether power information exists for that particular data independent of the execution code and control a power mode of the processor or sub-processor based on the corresponding found power information for that particular data and also provide the requested particular data to the requesting processor for processing of the particular data based on that controlled power mode.

Figure 4:
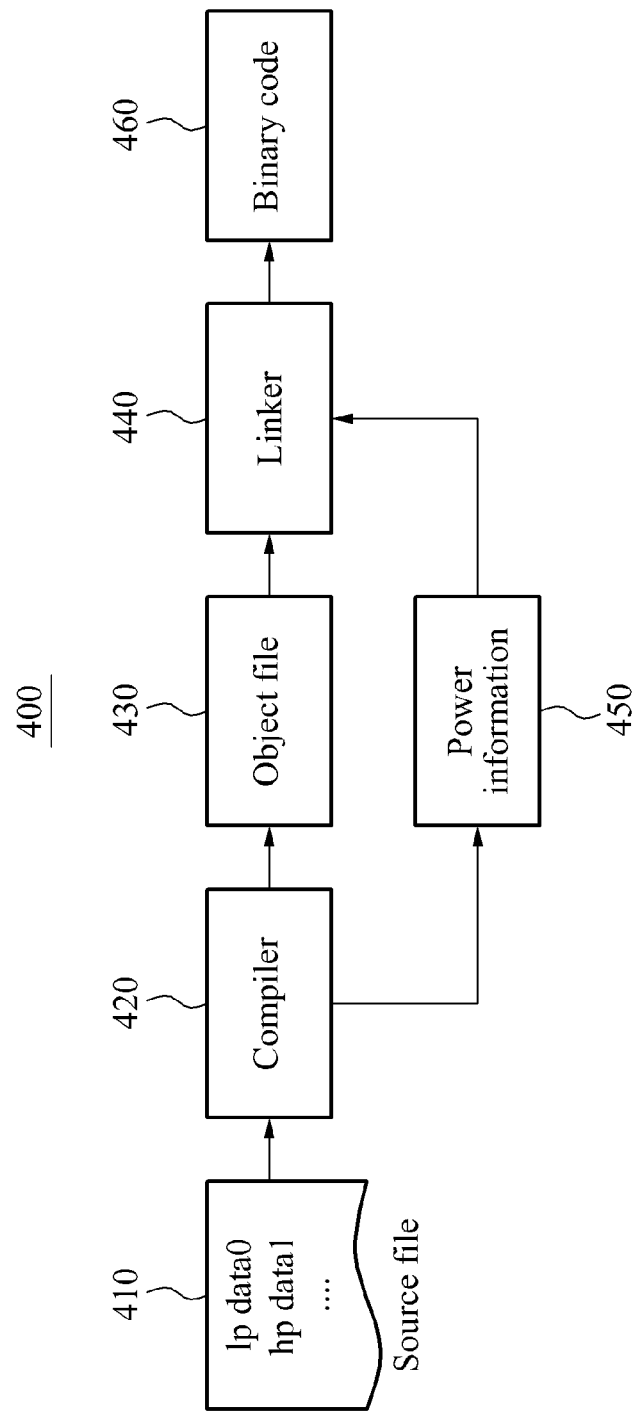
FIG. 4 illustrates a method of generating data-based power information, according to one or more embodiments.

FIG. 4 illustrates a method of generating data-based power information, according to one or more embodiments.

For example, FIG. 4 demonstrates a system and process 400 for generating a binary file including power information code and an execution code. Conventionally, a compiler may change a source code to an object code, and a linker may generate a binary file or code corresponding to objects of the object code.

According to the one or more embodiments, a compiler 420 may generate the execution code, e.g., based on the compiler generated object file 430, and generate a power information code including power information 450, based on power management indicators included in a source code, corresponding to a source file 410.

In this example, a linker 440 may generate a resulting binary file 460, e.g., a binary code, including the generated power information code and the generated execution code. For example, the linker 440 may incorporate the power information code, derived from the power information 450, into of the binary file 460 while also generating the binary file 460 with respect to the execution code of the object file 430, through linking. The linker 440 may alternatively incorporate a data code, e.g., at least incorporating data of the power information 450, while also generating the binary file 460 with respect to the execution code. The data code may ultimately be available to the example processing apparatus 100 of FIG. 1 and also include differing data the processor or sub-processor(s) may request for processing operations. Still further, though an execution code has been discussed, alternative code or information derived from a combining of parts of the object file(s) may be linked by the linker 440 with the power information code or data code. Depending on embodiment, the example processing apparatus 100 of FIG. 1 may use the example power information code or data code to determine whether power information exists for a particular data requested by a processor or sub-processor, and for providing the found power information to the example power controller 130 of FIG. 1 for controlling the power mode of one or more processors or sub-processors of the processing apparatus.

In one or more embodiments, the processing apparatus 100 of FIG. 1 may further implement the process of FIG. 4, with the identified source file 410, compiler 420, power information 450, object file 430, linker 440 and binary file 460, so that the processor 140 of FIG. 1 may execute the execution code from the binary file 460 and a power information manager, e.g., included in the memory controller 120, may determine whether power information exists for a particular data based upon address and power information included in a power information set represented in the power information code from the binary file 460.

FIG. 5 illustrates a power information set 500, according to one or more embodiments.

Referring to FIG. 5, the power information set 500 may represent example information included in power information code that may be linked by a linker with the execution code, for example, when the binary file is generated. This example information included in the power information code will be hereafter referred to as the power information set. The power information set 500 may include a plurality of power information tuples, i.e., a plurality of ordered lists including information. For example, an address column of the power information set 500 may represent respective initial virtual addresses for differing data that a processor may request and for which power information exists. The address of the information set 500 may be an address in a virtual address space assigned to the binary file. In one or more embodiments, there may be a particular power information set for any particular binary file. For example, a binary file a first application may include power information code corresponding to a first power information set, and a binary file for a second application may include power information code corresponding to a second power information set. As illustrated in FIG. 5, the respective power information set 500 may include virtual addresses of corresponding data for which power information exists, length information for the corresponding data, respective power modes for the corresponding data, and respective weightings for power management based on the corresponding data.

For example, a processing apparatus, according to one or more embodiments, may have access to the power information code along for a particular program or execution code or file, and derive a table, e.g., a power information table, corresponding to the power information set 500 of FIG. 5. As only an example, the power information manager regarding the processing apparatus 100 of FIG. 1 may generate such an example power information table that includes respective initial physical addresses of the memory 110 for respective data, corresponding to a potential conversion of the respective virtual address identified in the power information set 500 to a physical address, and lengths of the respective data in the memory 110. The generated power information table may further include the respective power modes and/or weights corresponding to the power modes and weights identified in the power information set 500. Accordingly, for one or more embodiments, FIG. 5 can be interpreted as demonstrating an information organization (or inclusion) for either a power information set or such a power information table, noting that in this example the power information set may be represented in the power information code and the power information table may be represented in a memory, e.g., of a power information manager, of the processing apparatus, such as the processing apparatus 100 of FIG. 1. In one or more embodiments, during processing of data by a processor or sub-processor, the example power information manager may verify whether a memory address requested by a processor is within a corresponding physical address range of the requested data stored in the memory 110. In such an example, the identified range of physical addresses in the generated power information table may be referred to as a "power region". Thus, the processing apparatus may compare addresses of processor requested data with known power region(s) and be able to quickly determine whether power information exists for the requested data.

In the above example of FIG. 4, the power information 450 may be used to derive a power information set, such as power information set 500, based on the existence of power management indicators in the example source code. As also noted above, such power information 450 that may be used to derive the power information set may be derived from alternate sources other than the source code. The information included in the generated power information table corresponding to the power information set 500, as represented by the power information code, may also be specified by a user of the processing apparatus, e.g., in addition to the received information from the power information set 500, or reconstructed during a runtime of the processing apparatus when a corresponding program or execution code is executed. The weights of the generated power information table may also be determined or modified during a runtime of the processing apparatus to reflect a characteristic of an operation of the processor for which the corresponding data is being used.

In addition, as noted above, in one or more embodiments, a data code may be generated by the process 400 and included in the binary file 460 by the linker 440. For example, such information from the power information 450, e.g., represented as a power information set similar to FIG. 5, could be selectively included in the generated data code that is linked with the example execution code or file when generating the binary file 460. Thus, the data processing apparatus 100 of FIG. 1, for example, may use this data code to generate a data portion of the memory 110, for storing the differing data that may be requested by a processor. Such a memory 110 may also store the corresponding execution file including the execution code. In one or more embodiments, the data processing apparatus 100 may initially analyze the data code or the data portion of the memory 110 for particular data that includes power information, in which case the example power information manager of the processing apparatus 100 could generate a power information table. As the data portion of the memory 110 is analyzed, and particular data that includes power information is found, the addresses and example lengths of the particular data that includes power information in the data portion of the memory 110 may be stored in a power information table. Thus, in this example, when the power information manager determines that a request has been issued for a particular data for the processor 140, the power information manager may compare an address included in the request to the respective address regions included in the power information table and immediately know whether the particular data is stored in the data portion of the memory 110 with that particular data.

Alternatively, as the processing apparatus 100 receives requests for particular data by a processor or sub-processor, a corresponding portion of the data portion of the memory 110 may be read by the memory controller 120 of FIG. 1 to extract the requested particular data, and in that process if corresponding power information for that particular data is also read by the memory controller 120, because the corresponding power information may be stored with particular data, then the power information manager may be provided that read power information to provide that power information to the power controller 130 of FIG. 1 for management of the power mode of the processor or sub-processor that requested the particular data, the power information manager may generate or update the example power information table similar to the power information set of FIG. 5, and the memory controller 120 may provide the requested particular data to the requesting processor or sub-processor. Thereafter, in this example, when any processor or sub-processor provides an address to the memory controller 120, for example, for a particular data that is stored in the data portion of memory 110, the power information manager may only need to compare that provided address to the addresses known to include power information, identified in the power information table, and may be able to use the generated power information table to immediately provide the corresponding power information to the power controller 130, rather than having to wait for the memory controller 120 to read such power information from the data portion of the memory 110.

Figure 6:
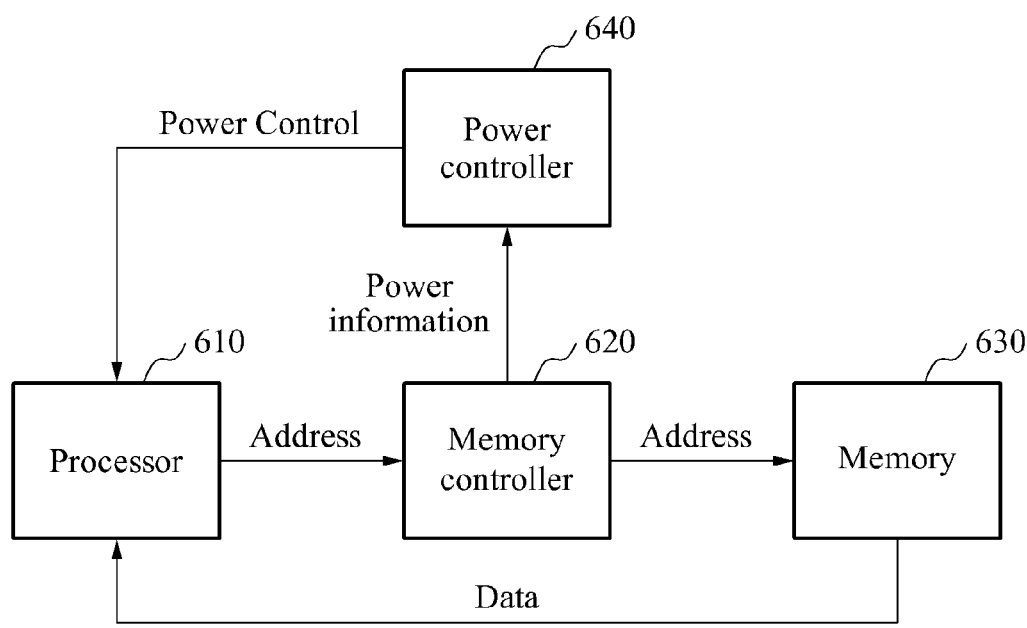
FIG. 6 illustrates a processing apparatus, according to one or more embodiments.

FIG. 6 illustrates a processing apparatus 600, according to one or more embodiments.

Referring to FIG. 6, the processing apparatus 600 may verify whether power information exists corresponding to particular data, in a memory 630, requested by a processor 610.

When power information corresponding to the particular data in the memory 630 is determined to exist, a memory controller 620 may provide the determined power information to a power controller 640. Thus, the power controller 640 may control a power mode of the processor 610 based on the provided power information. Here, the memory controller 620 may perform an address conversion, and the like, e.g., of the address requested by the processor 610 for identifying the physical address in the memory 630 for the underlying requested data and/or of a virtual address identified in the above example power information code included in the binary file, e.g., corresponding to the power information set 500 of FIG. 5, and the power controller 640 may adjust a power mode of the processor 610 based on a predetermined policy, including being based on such provided power information.

A number or a configuration of the memory controller 620 or the power controller 640 in the processing apparatus 600 may be changed. As only an example, a position and a configuration of the memory controller 620 with regard to the processing apparatus 600 may be changed depending on a type and a position of the memory 630 with regard to the processing apparatus 600.

Figure 7:
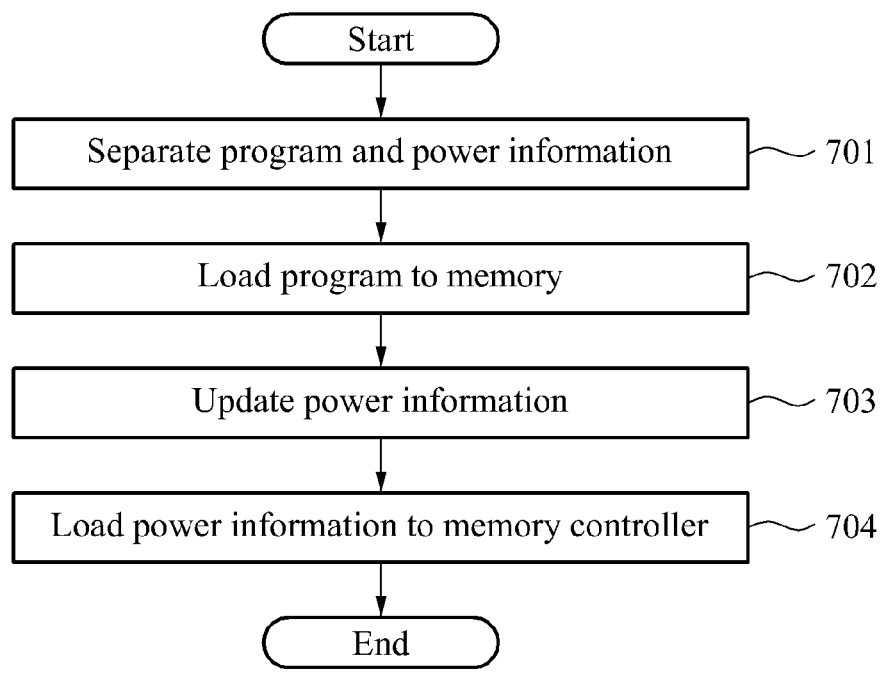
FIG. 7 illustrates a method of loading data-based power information, according to one or more embodiments.

FIG. 7 illustrates a method of loading data-based power information, according to one or more embodiments.

Referring to FIG. 7, an application binary file may include a power information code and/or a data code, including power information, and an execution code for a corresponding application. In a data-based power management method, the execution code and the power information code (or data code) may be separated or extracted from a binary file, in operation 701.

In operation 702, a typical loading process may be performed with respect to the execution code. When a physical address of a memory portion of a memory for the program is determined, e.g., as a result of performing the loading process, any known or determined virtual addresses corresponding to power information may be updated or converted, in operation 703.

In operation 704, power information may be loaded to the memory controller, e.g., when the memory controller includes an example power information manager. Here, the loaded power information may include only the address information of particular data for which power information exists, or may include the address information and power information that may thereafter be provided to a power controller for controlling the power mode of the processor. As only an example, this address information and power information may be included in a power information table, as referred to above. The address information may include the initial address of the particular data and a length of the particular data, for example.

Accordingly, such address information may be used to verify whether, for particular data requested by the processor, corresponding power information exists. Although the memory controller may perform verification and loading of the power information, another device may perform such processes. For example, the power controller may perform all of the processes of FIG. 7.

The processing apparatus 100 of FIG. 1, according to one or more embodiments, may further include a binary file processor and a memory loader, for example.

In one or more embodiments, the example binary file processor may obtain a binary file, and extract an execution code and a power information code from the binary file, with the power information code including respective power information for differing data that a processor or sub-processor may request, e.g., when executing the execution code. In addition, the execution code may include a command code The memory loader may load the extracted execution code to the memory, and the power information manager included in the memory controller 120 of FIG. 1, for example, may update or generate the power information table, based on the extracted power information code, and potentially based on a result of the loading of the execution code, in one or more embodiments, e.g., based on physical addresses of the loaded execution code and/or corresponding loaded data that may be processed by the processor 140 based on the execution code.

Figure 8:
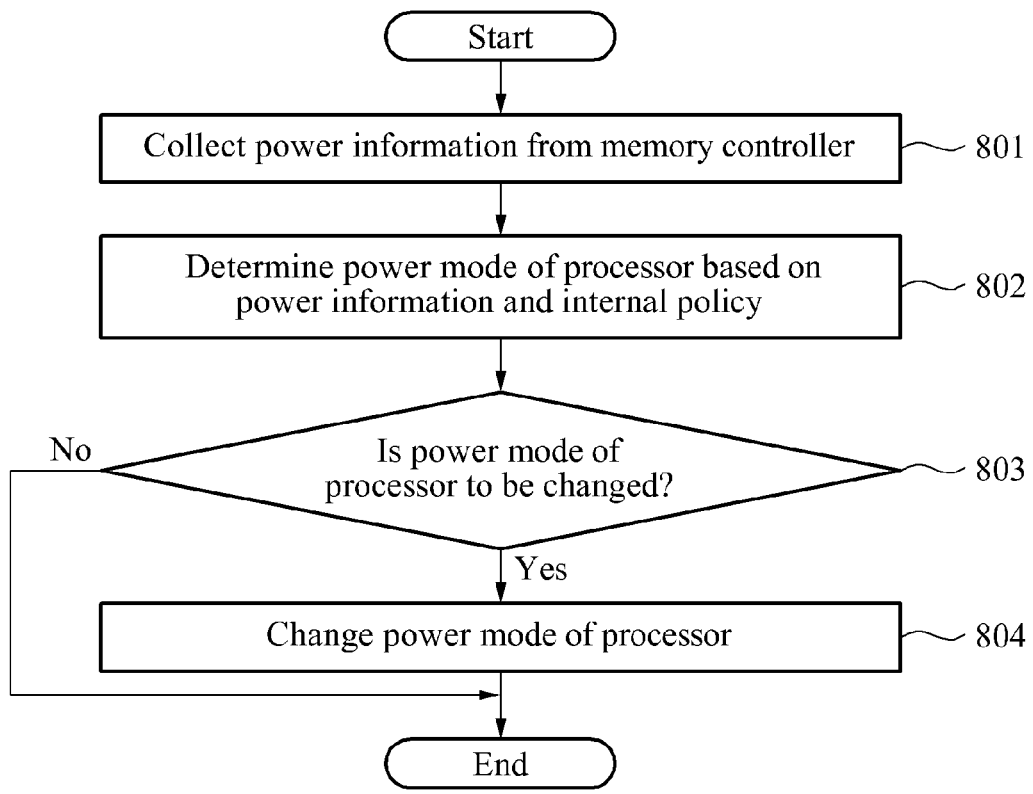
FIG. 8 illustrates an operating method of a power controller for managing power based on data, according to one or more embodiments.

FIG. 8 illustrates an operating method of a power controller for managing power based on data, according to one or more embodiments.

Referring to FIG. 8, in a data-based power management method, according to one or more embodiments, a memory may store and maintain data for which a type of power management has been classified.

In the data-based power management method, a processor may process differing data, such that a memory controller may receive a request for a particular data from the processor, read the particular data from the memory in response to the received request, and provide the read particular data to the processor.

In addition, a power controller may control a power mode of the processor based on determined power information corresponding to the requested particular data.

In particular, the request by the processor to process the particular data may be a request, including a particular memory address, for particular data at the particular memory address.

The memory controller may verify whether the requested memory address corresponds to data that includes power information. In this example, a range of addresses for each particular data for which power information exists may be referred to as a "power region." When the requested memory address is determined to be within such a power region, the corresponding power information for the requested data may be transferred to the power controller, and the power controller may collect the transferred power information from the memory controller, in operation 801.

In operation 802, the power controller may determine the appropriate power mode of the processor for the requested data, based on the transferred power information from the memory controller. The power controller may determine the power mode using various schemes. For example, the power controller may determine the appropriate power mode of the processor for the requested data based on the corresponding power information and a predetermined internal policy, for example.

In this example, the power controller may determine the appropriate power mode by applying the power mode indicated in the corresponding power information transferred from the memory controller. In addition, the power controller may determine the appropriate power mode based on a result of profiling an existing power mode of the processor already/previously controlled by the power controller.

In one or more embodiments, the power controller may not update the power mode of the processor at each instance a number of different power information are alternately transferred to the power controller from the memory controller. In this example, the power controller may determine the appropriate power mode, by obtaining an average of respective values representing the different transferred power information.

Here, as only an example, the power controller may perform a computing operation to determine the appropriate power mode by applying a corresponding power information weight based on a current or previous processing of coding of the execution code, such as the power information weight demonstrated in FIG. 5 and/or alternative weighting factors. Thus, the power information weight may also be determined during processing operations of the processor. For example, when data is used in a repetitive statement of the execution code, the power controller may assign a relatively high weight by which the processor requested data affects the determination of the appropriate power mode for the processor.

In operation 803, the power controller may determine whether the power mode of the processor is to be changed, based on the determined appropriate power mode.

When it is determined that the power mode of the processor may be changed, the power controller may perform a procedure of selectively changing the power mode of the processor, in operation 804. When a change of the power mode of the processor is determined unnecessary, the power controller may terminate power management.

Although the power mode is unchanged, the power information transferred to the power controller may be managed or stored separately by the power controller, for example, for future profiling. In one or more embodiments, the power controller may receive multiple power information inputs from a number of memory controllers or multiple power information inputs from a single memory controller, and determine the appropriate power mode for the processor based upon a review of the multiple power information inputs, and potentially such profiling based on previous power information inputs.

In one or more embodiments, the power controller 130 of FIG. 1 may include a power mode determiner and a power mode controller.

The power mode determiner may determine the appropriate power mode of the processor 140 of FIG. 1, for example, based on the transferred power information. In this example, the power mode determiner may select a single power mode, from a plurality of available power modes available for the processor 140, based on determined appropriate power mode.

In this example, the power mode controller may compare a current power mode of the processor 140 to the determined appropriate power mode, thereby determining whether the power mode of the processor 140 is to be changed.

For example, when the current power mode of the processor 140 is identical to the determined appropriate power mode, the power mode controller may not generate a separate control signal to change the power mode of the processor 140. Conversely, when the current power mode of the processor 140 is different from the determined appropriate power mode, the power mode controller may generate a control signal to change the power mode of the processor 140.

Figure 9:
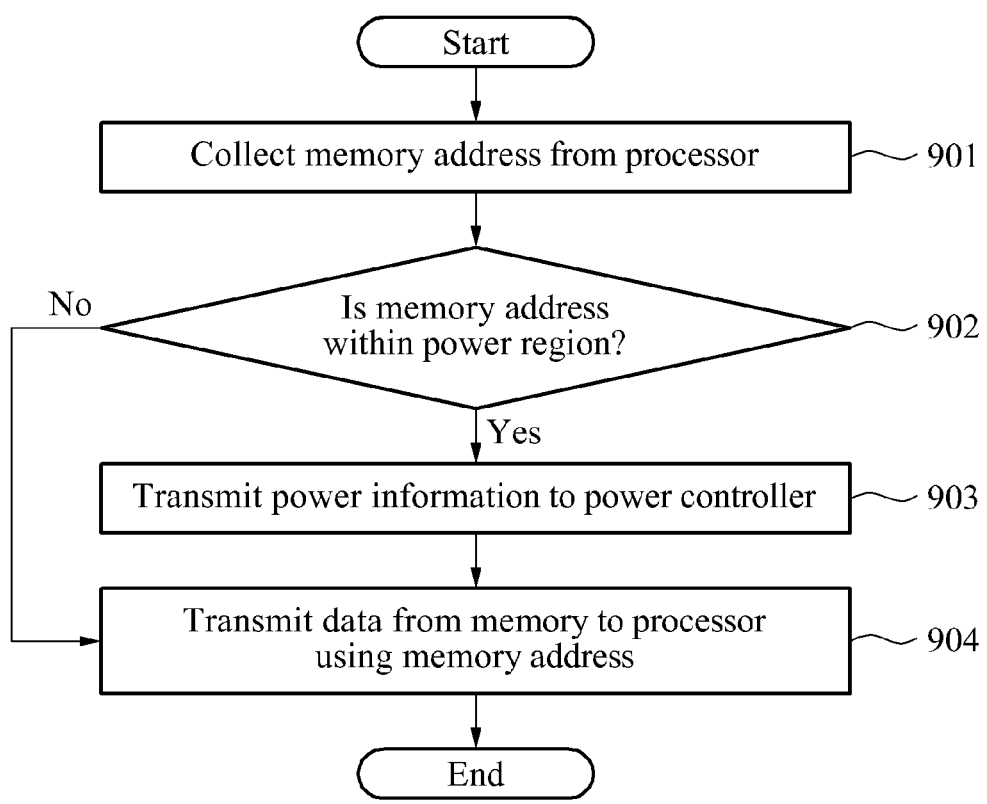
FIG. 9 illustrates an operating method of a memory controller for managing power based on data, according to one or more embodiments.

FIG. 9 illustrates an operating method of a memory controller for managing power based on data, according to one or more embodiments.

Referring to FIG. 9, the memory controller may collect a memory address from an access request signal, representing particular data requested by the processor, in operation 901.

In operation 902, the memory controller may verify whether the collected memory address is within a power region, the power region representing addresses or address ranges of differing data for which power information is known to exist for select differing data stored in the memory. When the collected memory address is within the power region, the memory controller may transmit power information corresponding to the requested particular data to a power controller, in operation 903.

In addition, the memory controller may transmit the requested particular data from the memory to the processor using the collected memory address, in operation 904. For example, the memory controller may perform an operation of transferring the requested particular data, corresponding to the collected address, from the memory to the processor, for processing of the requested particular data.

If the collected memory address is verified to be outside of a power region, the memory controller may merely transfer the requested particular data from the memory to the processor, in operation 904.

For example, in one or more embodiments, when the collected memory address does not correspond to data within one or more respective power regions, the collected memory address may represent a conventional form of stored data requested by and provided to a processor, for which power information does not exist. Accordingly, the memory controller may perform an operation of transferring the requested particular data corresponding to the collected address from the memory to the processor.

The memory controller may perform a conversion of the collected address. In one or more embodiments, the processor may include a module configured to convert a virtual address into a physical address of the memory. In the conversion process, a power region detection logic may be used additionally to perform power management without an execution overhead. In particular, the memory controller may include parallel hardware components so that the memory controller may perform the conversion of collected addresses from one or more processors in parallel with potential corresponding power management, thereby performing power management without execution overhead.

Information of the addresses of the differing data for which power information exists, e.g., information of respective power regions, may be stored as a unit of a memory, or respective units of the memory, maintained by the memory controller, for example, a unit of a cache line, a page, and a minimum unit of the memory address, such as for the initial address of each particular data for which power information exists. As noted above, a corresponding power information manager may alternately be included in the power controller, so that such an example unit of memory may be maintained by the power controller. When mapping and management suitable for the memory address requested by the processor are possible in reality, any unit may be used.

In the above example, the power information manager may be included in the memory controller 120 of FIG. 1 and may include an address obtainer, a power information verifier, and a power information provider, for example.

The address obtainer may obtain/collect a memory address included in an access request signal from the processor 140 of FIG. 1. The power information verifier may verify whether power information exists for stored data corresponding to the memory address requested to be accessed, such as by reviewing the aforementioned generated power information table that may represent power information similar to the power information set 500 of FIG. 5.

The power information provider may provide the power information to the power controller 130 of FIG. 1, when the power information corresponding to the memory address requested to be accessed is determined to exist.

One or more embodiments may include an apparatus and method for managing power based on data that may perform data-centric power management at a hardware level.

Power management of a processor may be based on power information corresponding to particular data processed by the processor. Accordingly, in one or more embodiments, when a user specifies the power information, e.g., at a stage when a power information code (or data code) is linked with an execution code for an underlying application and/or a stage after a processing apparatus receives the execution code and coded information of the power information for particular data, all processors may perform power management automatically with respect to that particular data.

Accordingly, one or more embodiments may also include an apparatus and method for managing power of one or more processors based on data that may enable power management by specifying a type of power management that should be implemented corresponding to particular data, thereby increasing convenience of users, compared to a conventional code-centric technology of managing power of all processors through execution code.

One or more embodiments may also include an apparatus and method for managing power usage based on data that may enable fine-grained power management, compared to coarse-grained power management for a typical case in which the user must directly manage power management for each processor. The fine-grained power management may be available because power management may be set for separate data.

Depending on embodiment, apparatuses, systems, and units descriptions herein may respectively include one or more hardware devices or hardware processing elements. For example, in one or more embodiments, any described apparatus, system, and unit may further include one or more desirable memories, and any desired hardware input/output transmission devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented by at least one processing device, such as a processor or computer. Further to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device. The processing element may be a specially designed computing device to implement one or more of the embodiments described herein.

The computer-readable media may also be embodied in at least one application specific integrated circuit (ASIC) or Field Programmable Gate Array (FPGA), as only examples, which execute (processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A processing apparatus comprising:
   a processor;
   a power information manager configured to
      receive an access request requesting provision of a particular data to the processor, the access request comprising a memory address of the particular data,
      determine whether the memory address is located within a power region, the power region indicating a range of memory addresses for which power information exists, and
      upon determining that the memory address is located within the power region, determine predefined power information corresponding to the particular data, the predefined power information indicating a suggested power mode for the processor when the processor processes the particular data; and
   a power controller configured to, upon determining the predefine power information, control a current power mode of the processor when the processor processes the particular data based on the predefined power information.

2. The apparatus of claim 1, wherein the predefined power information indicates one of plural suggested power modes for the processor when the processor is processing data, the plural suggested power modes including at least a lower power mode, a higher power mode, and a power mode between the lower power mode and the higher power mode.

3. The apparatus of claim 2, wherein the power information manager determines whether the predefined power information exists in a generated power information table, the generated power information table respectively including address information and corresponding predefined power information for different particular data.

4. The apparatus of claim 3, wherein the power information manager generates the power information table by analyzing a power information code associated with an execution code providing execution instructions to the processor regarding processing the particular data.

5. The apparatus of claim 4, wherein the power information code is linked by a linker of a compiling system with the execution code to generate a binary file, with a compiler of the compiling system extracting power information, respectively identified in a source code with respect to data from the source code, that is included in the power information code, distinguished from a generating of the execution code from a compiling of the source code.

6. The apparatus of claim 5, wherein the power information code includes, for each compiler identified data for which power information exists, address information of each compiler identified data and power mode information for each compiler identified data, and the generated power information table includes extracted address information for each compiler identified data and extracted power mode information for each compiler identified data.

7. The apparatus of claim 4, wherein the power information manager determines whether the predefined power information exists in the generated power information table by comparing a data address included in the access request with a plurality of different determined ranges of addresses represented in the generated power information table to determine whether the data address included in the access request falls within any of the different determined ranges of addresses, and if yes, locate a corresponding power information identified in the generated power information table for a found determined range of addresses that the data address included in the access request falls within,
   wherein each of the different determined ranges of addresses represent different data stored in a memory that the processor is set to process when executing the execution code.

8. The apparatus of claim 2, wherein the power information manager determines whether the predefined power information exists in a generated power information table, the generated power information table including at least address information of select data, of plural data stored in a memory, for which power information exists,
   wherein the plural data stored in the memory are data set for processing by the processor when executing an execution code.

9. The apparatus of claim 8, wherein the power information manager determines whether the predefined power information exists by comparing a data address included in the access request with a plurality of different determined ranges of addresses represented in the generated power information table to determine whether the data address included in the access request falls within any of the different determined ranges of addresses, and if yes, locate a corresponding power information for a found determined range of addresses that the data address included in the access request falls within, wherein each of the different determined ranges of addresses represent different data stored in the memory that the processor is set to process when executing an execution code.

10. The apparatus of claim 8, further comprising a memory manager to perform a reading operation to read the particular data from the memory based on a data address included in the access request, wherein the power information manager generates or adds to the power information table when power information corresponding to the particular data is read in the reading operation, to include address information of the particular data in the power information table.

11. The apparatus of claim 10, wherein, in the generating of or adding to the power information table, the power information manager includes the read power information corresponding to the particular data in the power information able.

12. The apparatus of claim 1, further comprising a memory to store differing data, including the particular data, that the processor is set to process when executing an execution code.

13. The apparatus of claim 12, wherein the power information manager comprises:

an address obtainer to obtain a memory address included in the access request for the particular data in the memory;

a power information verifier to determine whether the predefined power information exists based on a comparison of the obtained memory address and plural address information in a power information table, each of the plural address information in the power information table representing address information for a data, of the differing data stored in the memory, for which corresponding predefined power information exists; and a power information provider to provide, when the power information verifier determines that the predefined power information exits, the predefined power information to the power controller.

14. The apparatus of claim 13, wherein the power information table comprises a plurality of power information tuples, and wherein each of the plurality of power information tuples comprises at least one of:

an initial address of a respective stored data, in the memory, for which power information exists;

a length of the respective stored data; and an indication of a suggested power mode, corresponding to the respective stored data, for the processor when the processor is processing the respective stored data.

15. The apparatus of claim 14, wherein each of the plurality of power information tuples further comprise a respective weight for the suggested power mode, corresponding the respective stored data, and the power controller uses the respective weight to control the processor to operate according to a determined appropriate power mode when the processor is processing the respective stored data.

16. The apparatus of claim 15, wherein the power controller stores, separate from the power information table, power information of an immediately previous power mode of the processor and/or an immediately previous determined appropriate power mode for the processor, and determines a current appropriate power mode for the processor, to be implemented when the processor is processing a current respective stored data, based on at least two of the stored power information of the immediately previous power mode, the immediately previous determined appropriate power mode, and a current respective weight corresponding to the current respective stored data.

17. The apparatus of claim 12, wherein the power controller comprises:

a power mode determiner to determine an appropriate power mode for the processor, to implement when the processor is processing the particular data, based on the predefined power information; and a power mode controller to control the current power mode of the processor to be the appropriate power mode.

18. The apparatus of claim 12, further comprising:

an binary file processor to obtain a binary file, and to extract an execution code and a power information code from the binary file; and a memory loader to load the execution code to the memory, wherein the power information manager generates or updates a power information table based on the power information code, and wherein the power information code is configured to include, for each of select data of the differing data stored in the memory, information to identify the select data, from the differing data, and a corresponding suggested power mode for the processor to implement when the processor is processing the select data.

19. The apparatus of claim 18, wherein the power information manager generates or updates the power information table based on the power information code and a result of the loading of the execution code to the memory.

20. The apparatus of claim 19, wherein the power information table is generated or updated based on the information to identify the select data, in the power information code, being a virtual address of the select data and the power information table including corresponding information to identify the select data, from the differing data stored in the memory, as a physical address of the memory.

21. The apparatus of claim 18, wherein the binary file is generated by a compiler and a linker of a compiling system, with the linker having linked the execution code and the power information code to generate the binary file, such that the power information code is based on power information extracted from a source code by the compiler using power mode indicators included in the source code identifying particular respective data in the source code, distinguished from a generation of the execution code by a compiling of the source code by the compiler.

22. A processing apparatus comprising:

a plurality of processors;

a power information manager configured to receive an access request requesting provision of a particular data to a select processor of the plurality of processors, the access request comprising a memory address of the particular data, determine whether the memory address is located within a power region, the power region indicating a range of memory addresses for which power information exists, and upon determining that the memory address is located within the power region, and determine predefined power information corresponding to the particular data, the predefined power information indicating a suggested power mode for any of the plurality of processors when the select processor processes the particular data; and a power controller configured to, upon determine the predefined power information, control a current power mode of the select processor when the select processor processes the particular data based on the predefined power information.

23. The apparatus of claim 22, further comprising a memory to store differing data, including the particular data, that the plurality of processors are set to process when executing an execution code.

24. The apparatus of claim 22, wherein the power information manager provides, to the power controller, the predefined power information to control the current power mode of the select processor when the select processor is processing the particular data, and provides the predefined power information to the power controller to control a power mode of at least another processor, of the plurality of processors, in response to an access request requesting provision of the particular data to the other processor, so that the predefined power information is provided to the power controller for the particular data irrespective of which of the plurality of processors requests the particular data.

25. The apparatus of claim 22, wherein, when a first processor and a second processor, of the plurality of processors, request respective data for which there respectively exists corresponding identical power information, the power controller controls a power mode of the first processor and a power mode of the second processor differently, based on the identical power information.

26. An apparatus for managing power based on data, the apparatus comprising:

a processor;

a memory controller configured to read select data, including a particular data from among a data set of differing data, for selective processing by the processor during an execution process, wherein the select data is read from a memory in response to an access request requesting provision of the particular data to the processor, and provide the read particular data to the processor; and a power controller configured to determine whether power information is included in the read select data, the power information including a suggested power mode for the processor when the processor processes the particular data, and control a current power mode of the processor based on the power information.

27. The apparatus of claim 26, further comprising the memory to store the differing data, the differing data including data for which respective power information for controlling respective power modes of the processor exists and data for which respective power information for controlling respective power modes of the processor do not exist.

28. The apparatus of claim 26, wherein the power information included with the particular data in the read select data is distinct from another power information included in another read select data, including another particular data, such that the other power information includes a different suggested power mode for the processor when the processor is processing the other particular data.

29. The apparatus of claim 26, wherein the memory controller provides, when the determination indicates that power information is included in the read select data, the power information to the power controller for the control of the current power mode for the processor when the processor is processing the particular data.

30. A processing method comprising:

receiving an access request requesting provision of a particular data to a processor, the access request comprising a memory address of the particular data;

determining whether the memory address is located within a power region, the power region indicating a range of memory addresses for which power information exists;

upon determining that the memory address is located within the power region, determining predefined power information corresponding to the particular data, the predefined power information indicating a suggested power mode for the processor when the processor processes the particular data; and upon determining the predefined power information, controlling a current power mode of the processor based on the predefined power information.

31. The method of claim 30, further comprising detecting for the access request for the particular data.

32. The method of claim 31, wherein the access request is requesting provision of the particular data from a memory, from differing data set for selective processing by the processor during an execution process.

33. The method of claim 32, wherein the detecting for the access request comprises obtaining a memory address included in the detected access request and the determining of whether the predefined power information corresponding to the particular data exists is based on a comparison of the obtained memory address and a power information table, wherein the obtained memory address corresponds to an address in the memory for the particular data.

34. The method of claim 33, wherein, when the determining of whether the predefined power information corresponding to the particular data exists based on the comparison, the predefined power information corresponding to the particular data is obtained from the power information table.

35. The method of claim 33, wherein the power information table comprises a plurality of power information tuples, and wherein each of the plurality of power information tuples comprises at least one of:

an initial address of a respective stored data, in the memory, for which power information exists;

a length of the respective stored data; and an indication of a suggested power mode, corresponding to the respective stored data, for the processor when the processor is processing the respective stored data.

36. The method of claim 35, wherein each of the plurality of power information tuples further comprises a respective weight of the suggested power mode, corresponding to the respective stored data, and the controlling of the current power mode of the processor includes controlling the processor to operate according to a determined appropriate power mode based on the respective weight when the processor is processing the respective stored data.

37. The method of claim 36, further comprising:
storing power information of an immediately previous power mode of the processor and/or an immediately previous determined appropriate power mode for the processor separate from the power information table; and
determining a current appropriate power mode for the processor, to be implemented when the processor is processing a current respective stored data, based on at least two of the stored power information of the immediately previous power mode, the immediately previous determined appropriate power mode, and a current respective weight corresponding to the current respective stored data.

38. The method of claim 32, wherein the controlling of the current power mode of the processor comprises:
determining whether a power mode of the processor is to be changed, for implementation when the processor is processing the particular data, based on the predefined power information; and
causing the power mode of the processor to change, based on a result of the determining, of whether the power mode of the processor is to be changed, indicating that the power mode of the processor is to be changed.

39. The method of claim 32, further comprising:
obtaining a binary file, and extracting an execution code and a power information code from the binary file;
loading the execution code to the memory; and
generating or updating a power information table based on the power information code,
wherein the power information code is configured to include, for each of select data of the differing data stored in the memory, information to identify the select data, from the differing data, and a corresponding suggested power mode for the processor to implement when the processor is processing the select data.

40. The method of claim 39, wherein the generating or updating of the power information table is based on the power information code and a result of the loading of the execution code to the memory.

41. The method of claim 40, wherein the power information table is generated or updated based on the information to identify the select data, in the power information code, being a virtual address of the select data and the power information table including corresponding information to identify the select data, from the differing data stored in the memory, as a physical address of the memory.

42. The method of claim 39, wherein the binary file is generated by a compiler and a linker of a compiling system, with the linker having linked the execution code and the power information code to generate the binary file, such that the power information code is based on power information extracted from a source code by the compiler using power mode indicators included in the source code identifying particular respective data in the source code, distinguished from a generation of the execution code by a compiling of the source code by the compiler.

43. A non-transitory computer-readable medium comprising computer readable code to control at least one processing device to implement the method of claim 30.

* * * * *